United States Patent [19]

English

[11] Patent Number: 5,015,543

[45] Date of Patent: May 14, 1991

[54] BATTERY TERMINAL CAP

[75] Inventor: James H. English, Anderson, Ind.

[73] Assignee: General Motors Corporation, Detroit, Mich.

[21] Appl. No.: 575,756

[22] Filed: Aug. 31, 1990

[51] Int. Cl.⁵ .............................................. H01M 2/34
[52] U.S. Cl. ..................................... 429/65; 429/182; 174/138 F
[58] Field of Search ................. 429/65, 182, 121, 122; 174/138 F, 188; 439/522

[56] References Cited

U.S. PATENT DOCUMENTS

| 2,564,810 | 8/1951 | Martin et al. | 429/65 X |
| 3,884,725 | 5/1975 | Schmidt | 429/65 |
| 3,956,576 | 5/1976 | Jensen et al. | 429/65 X |
| 4,761,354 | 8/1988 | Poe et al. | 429/65 X |
| 4,920,018 | 4/1990 | Turner | 429/65 |

FOREIGN PATENT DOCUMENTS 0111762 10/1940 Australia .............................. 429/65

Primary Examiner—Anthony Skapars
Attorney, Agent, or Firm—Lawrence B. Plant

[57] ABSTRACT

Protective cap for battery terminal having a base permanently secured about the root of the terminal and a readily separable tower joined to the base with a plurality of frangible links for facilitating ready separation and removal of the tower from the base.

8 Claims, 2 Drawing Sheets

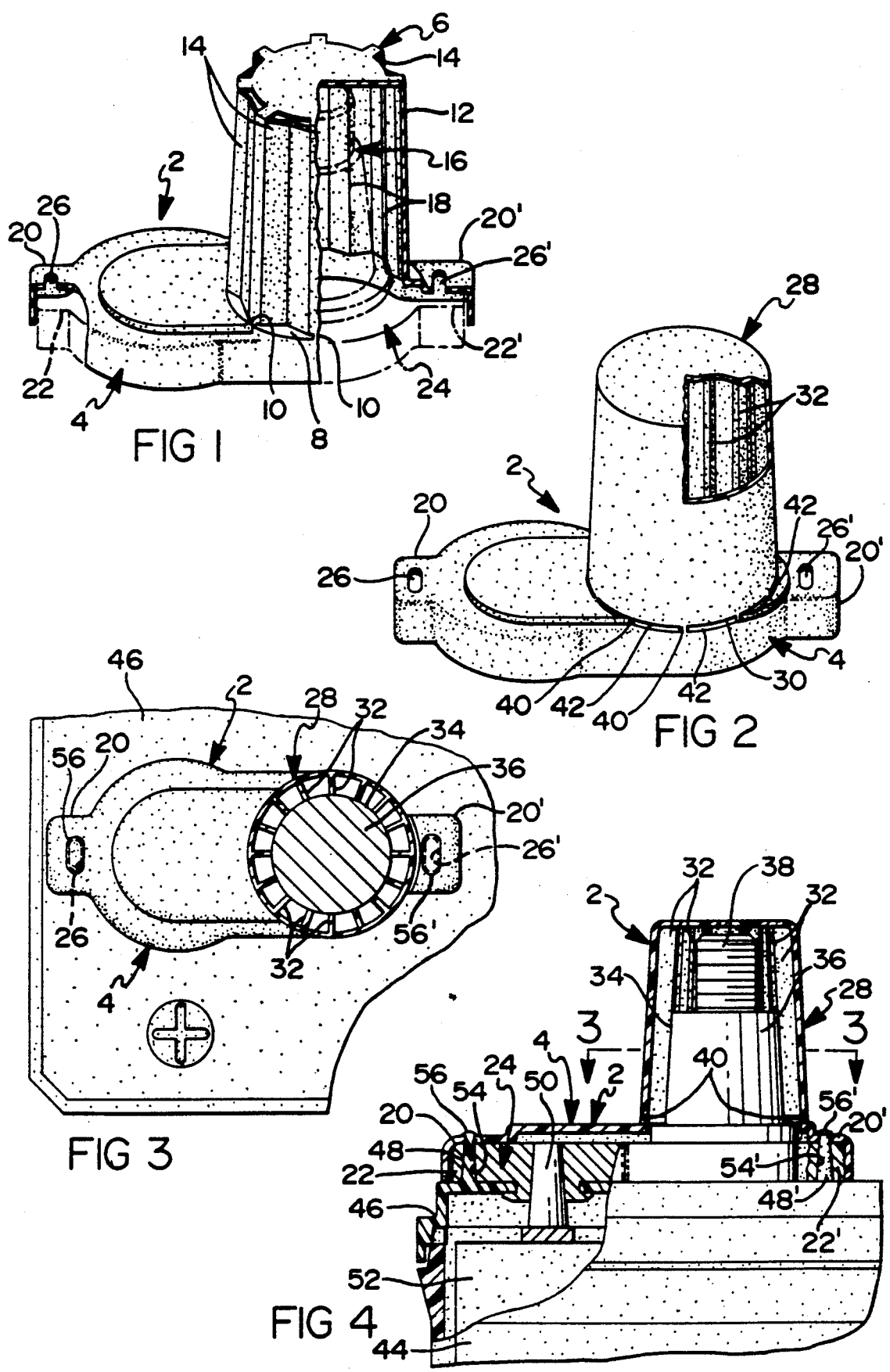

BATTERY TERMINAL CAP

This invention relates to electric storage batteries and more particularly to a protective cap for the terminals thereof.

BACKGROUND OF THE INVENTION

Electric storage batteries typically employ one or the other of two general types of terminals. One type has an internal, typically threaded, opening for receiving a fastener (e.g., bolt) which holds the battery cable in place. One such terminal is disclosed in Rowls et al, U.S. Pat. No. 3,775,730, assigned to the assignee of the present invention. The other type employs an external post projecting outwardly from the battery. The external connector post may comprise a threaded stud for mating with an eyelet on a battery cable or may comprise a tapered post often referred to as an SAE terminal post and described in SAE Standard J-537. Some replacement SLI batteries have both types of terminals.

Rowls et al-type terminals are protected from damage by virtue of their being recessed within the container wall. External-post type terminals, however, are susceptible to impact damage which can interfere with their ability to properly receive an appropriate cable connector. Moreover, external terminals, being more exposed, can result in the inadvertent discharge of the battery incident to short circuiting of the terminals. Accordingly, battery manufacturers commonly provide such posts with protective caps during the shipping and display phases of the batteries' lives (i.e., before sale to the consumer), when the terminals are most susceptible to such problems.

Moreover, a number of batteries have their external connector terminal posts axially offset from the internal cell element post which connects the external post to the battery's internal cell elements through a wall of the container. Batteries having such offset terminals are additionally susceptible to damage resulting from either lifting of the distal end of the terminal remote from the cell element post or twisting of the cell element post resulting from the additional torque applied thereto by the lever, arm provided by the offset terminal.

It is an object of the present invention to provide a unique shipping and display cap for an electric storage battery terminal which includes a base permanently secured about a root of the terminal and a separable tower adapted for ready separation from the base when the battery is put in service. It is still a further object of the present invention to provide an electric storage battery with such a cap for a battery terminal whose external terminal post is axially offset from the battery's internal cell element post including common means for both securing the cap's base about the terminal root and preventing accidental lifting or rotation of the terminal with respect to the cell element post.

These and other objects and advantages of the present invention will become more readily apparent from the detailed description thereof which follows and which is given hereafter in conjunction with the several Figures, wherein:

FIG. 1 is a partially broken away perspective view of one embodiment of the present invention;

FIG. 2 is a partially broken away perspective view of another embodiment of the present invention;

FIG. 3 is a sectioned view in the direction 3—3 of FIG. 4;

FIG. 4 is a partially broken away and sectioned side view of the battery terminal cap in accordance with the present invention in its intended position on the battery;

SUMMARY OF THE INVENTION

Figure 5:
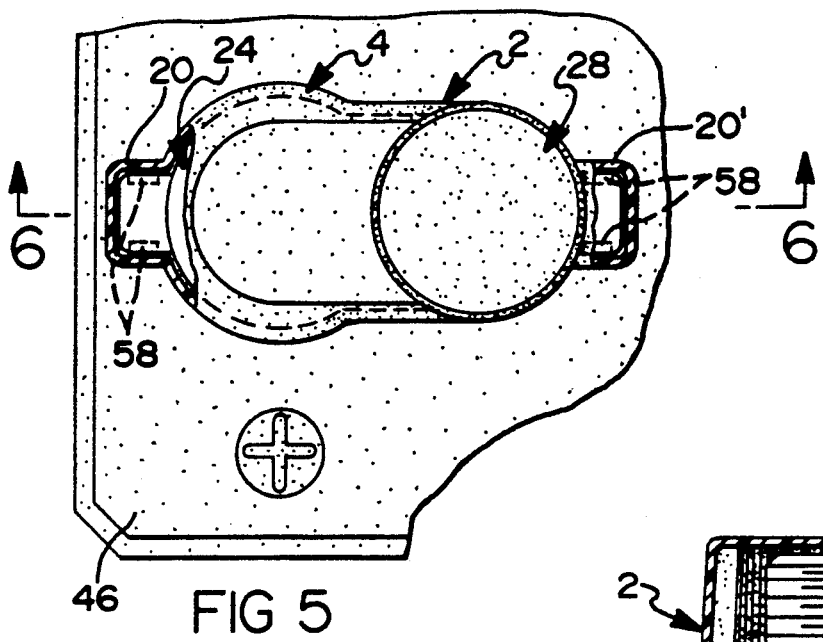
FIG. 5 is a partially broken away plan view of another embodiment of the present invention.

The present invention essentially comprehends a protective cap for a battery terminal comprising a base portion substantially permanently secured about the root of the terminal and a separate tower portion surrounding the terminal post and adapted to be readily, preferably manually, broken away from the base portion to ready the terminal post for connection to a battery connector.

DETAILED DESCRIPTION OF THE SPECIFIC EMBODIMENTS

FIG. 1 depicts a battery terminal cap 2 having a base 4 and a separable tower 6 joined to each other along a perforated parting line 8 comprising a plurality of frangible links 10 for temporarily holding the tower 6 to the base 4. The tower 6 is similar to that described in U.S. Pat. No. 4,761,354, assigned to the assignee of the present invention, and differs therefrom primarily in that the links 10 are sufficiently smaller, in the present invention, as to permit ready manual separation of the tower 6 from the base 4. Preferably separation will be effected by simply grasping the tower by hand and twisting it off of the base. Otherwise, the tower 6 comprises a corrugated wall 12 including a plurality of pleats 14 projecting inwardly toward a central cavity 16 which is adapted to receive a connector post of a battery terminal (not shown). Each pleat 14 includes a ridge 18 which engages the outer annular surface of the terminal post. The particular embodiment shown in FIG. 1 is adapted for use with battery terminals wherein the battery connector post is axially offset from the cell element post connecting the battery's innards to the battery terminal and accordingly includes a base 4 which extends radially outwardly from the tower 6. The base 4 includes a pair of lateral extensions 20 and 20' adapted to fit over ears 22 and 22' (shown in phantom) on the root 24 of the battery terminal (also shown in phantom). As will discussed in more detail hereinafter, the lateral extensions 20—20' include perforations 26 and 26' for receiving rivets formed integrally with the battery container to anchor the cap 2 atop the battery terminal.

FIG. 2 is similar to FIG. 1 differing therefrom primarily only with respect to the nature of the tower 28 and the parting line 30 resulting from the re-configured tower 28. In this regard and as best shown in FIGS. 3 and 4, the tower 28 includes a plurality of inwardly radially extending ribs 32 for engaging the outer surface 34 of the battery terminal connector post 36. The post 36 may or may not include a threaded stud 38 for receiving an eyelet-type battery cable connector. Like FIG. 1, the embodiments shown in FIGS. 2–4 includes a plurality of frangible links 40 separating the several perforations 42 in the parting line 30.

As best shown in FIG. 4, the battery itself includes a container 44 including a cover 46 which includes upstanding, integral projections 48 and 48'. The battery terminal includes a root 24 and connector post 36 formed integrally with the root portion 24 and axially offset from the cell element post 50 which extends through the cover 46 from the cell element 52 inside the battery. The root 24 includes a pair of ears 22 and 22' which have apertures 54 and 54' therethrough for receiving the projections 48 and 48'. During assembly, the cap 2 is placed over the terminal with the apertures 26 and 26, in registry with apertures 54 and 54' through the ears 22 and 22' and such that the projections 48 and 48' extend through the apertures 26 and 26'. Thereafter the distal ends 56 and 56' of the projections 48 and 48' are heated and deformed or mushroomed so as to securely engage the cap 2 and hold the base 4 thereof securely in place over the root 24 of the terminal. At the same time, the projections anchor the extremities of the root to the top 46 and thereby serve to resist damaging lifting and/or rotation of the terminal with respect to the element post 50.

Figure 6:
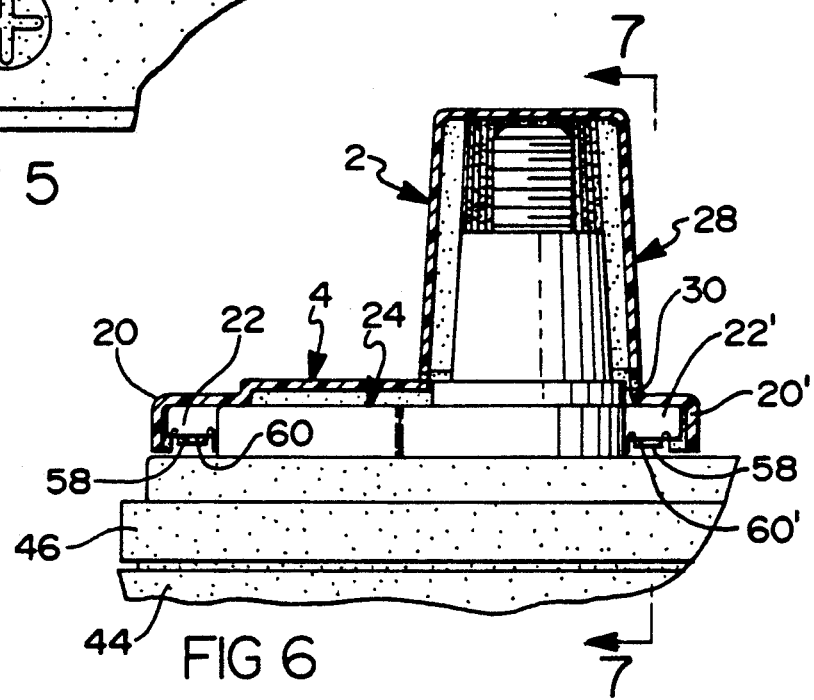
FIG. 6 is a partially sectioned partially elevational view in the direction 6—6 of FIG. 5.
Figure 7:
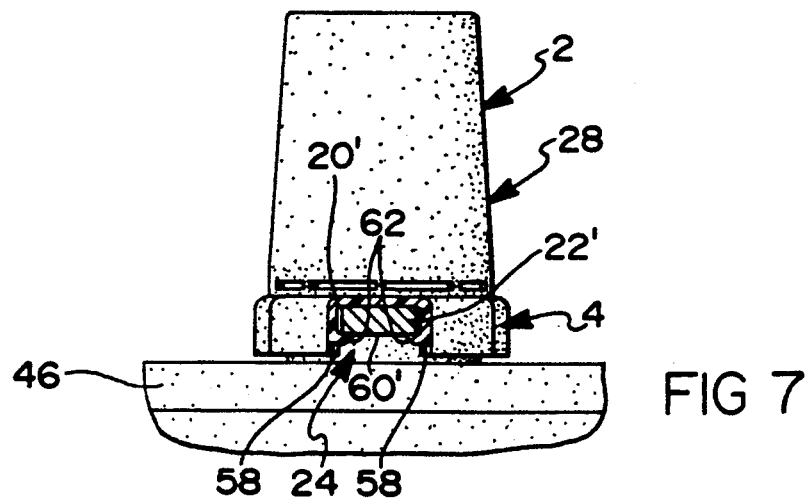
FIG. 7 is a view in the direction 7—7 of FIG. 6.

FIGS. 5-7 show another embodiment of the present invention which differs from the embodiment shown in FIGS. 2-4 primarily with respect to the means by which the base 4 is secured about the root 24 of the terminal. In this regard, the lateral extensions 20 and 20' of the cap include inwardly extending tangs 58 which engage the undersides 60 and 60' of the ears 22 and 22'. The tangs 58 are provided with chamfered lead-in surfaces 62 so that the cap may be placed on the terminal by merely pressing the cap firmly down atop the terminal such that the chamfered end of the tangs cause the tangs to spread and snap back in place beneath the ears 22 and 22'.

While the invention has been disclosed primarily in terms of certain specific embodiments thereof it is not intended to be limited thereto but rather only to the extent set forth hereafter in the claims which follows.

The embodiments of the invention in which an exclusive property or privilege is claimed are defined as follows:

1. In an electric storage battery having a container, a cell element in said container, a post extending from said element through a wall of said container, a terminal outside said container having a root engaging said element post and a connector post extending from said root for engaging a battery terminal connector, and a shipping and display cap for shielding said terminal against damage and protecting said battery from accidental discharge, the improvement wherein said cap comprises:
    a base permanently encasing said root while said battery is in service;
    means operatively associated with said base for anchoring said base about said root; and
    a tower separable from said base and encasing said connector post, said tower being joined to said base along a perforated parting line including a plurality of frangible links defining a plurality of perforations therebetween for facilitating ready separation and removal of said tower from said base to expose said connector post to receive said connector.

2. An electric storage battery according to claim 1 wherein said anchoring means engages said root to secure said base to said root.

3. An electric storage battery according to claim 2 wherein said anchoring means includes a plurality of tangs engaging the underside of said root to secure said base to said root.

4. An electric storage battery according to claim 1 wherein said anchoring means engages said container to secure said base to said root.

5. An electric storage battery according to claim 4 wherein said container includes an integral rivet engaging said anchoring means.

6. An electric storage battery according to claim 5 wherein said rivet extends through said root to also prevent rotation of said terminal relative to said element post.

7. An electric storage battery according to claim 1 wherein said links are such as to permit said tower to be separated from said base by manually twisting said tower portion relative to said base portion.

8. An electric storage battery according to claim 6 wherein said connector port is axially offset with respect to said element post and said root extends laterally outwardly from said connector post to engage said element post.

* * * * *